United States Patent [19]

Watt et al.

[11] Patent Number: 4,666,391

[45] Date of Patent: May 19, 1987

[54] APPARATUS FOR ROLLING UP A PASTRY LAYER AND A SEPARATOR SHEET

[75] Inventors: Robert J. Watt, Doncaster; Brian W. Obst, Williamstown; Raymond N. Skinner, Greensborough, all of Australia

[73] Assignee: Quaker Products Australia Limited, Australia

[21] Appl. No.: 683,274

[22] PCT Filed: Apr. 6, 1984

[86] PCT No.: PCT/AU84/00052

§ 371 Date: Dec. 5, 1984

§ 102(e) Date: Dec. 5, 1984

[87] PCT Pub. No.: WO84/04081

PCT Pub. Date: Oct. 25, 1984

[30] Foreign Application Priority Data

Apr. 8, 1983 [AU] Australia .................. PF8804/83

[51] Int. Cl.⁴ .................................................. A21C 3/06
[52] U.S. Cl. .................................... 425/122; 425/289; 425/320; 425/334
[58] Field of Search ................ 426/502, 503; 425/289, 425/296, 297, 310, 110, 122, 289, 319, 320, 321, 322, 334

[56] References Cited

U.S. PATENT DOCUMENTS

| | | | |
|---|---|---|---|
| 2,246,987 | 6/1941 | Roos | 425/289 |
| 2,268,390 | 12/1941 | Gase | 425/317 |
| 2,402,874 | 6/1946 | Cohen et al. | 425/90 |
| 2,450,033 | 9/1948 | Cohen | 425/391 |
| 2,687,699 | 8/1954 | Oakes | 425/310 |
| 2,804,831 | 9/1957 | Oakes | 425/312 |
| 2,851,966 | 9/1958 | Oakes | 425/297 |
| 3,704,664 | 12/1972 | Fisher | 425/321 |
| 4,053,641 | 10/1977 | Elling | 426/502 |
| 4,453,909 | 6/1984 | Lindauer et al. | 425/296 |

FOREIGN PATENT DOCUMENTS

| | | |
|---|---|---|
| 126635 | 12/1947 | Australia . |
| 158665 | 5/1953 | Australia . |
| 168033 | 10/1954 | Australia . |
| 778958 | 7/1957 | United Kingdom . |

*Primary Examiner*—Willard E. Hoag
*Attorney, Agent, or Firm*—Sughrue, Mion, Zinn, Macpeak and Seas

[57] ABSTRACT

Apparatus for handling a pastry product of the type comprising a pastry sheet unit and a film sheet unit which are adapted to be rolled together so that in the finished roll the film sheet unit is substantially interposed between the adjacent layers of the pastry sheet unit, the film sheet unit and pastry sheet unit each having a leading edge and trailing edge. In one aspect the apparatus is adapted to direct and apply the film sheet unit to a surface of the pastry sheet unit at a film application station so that the leading edge of the film sheet unit overlies and is disposed rearwardly of the leading edge of the pastry sheet unit. In another form of the apparatus it is characterised by transport means for transporting the pastry past the film application station whereafter the units are transferred to delivery means which presents the units to the rolling means the direction of travel of the transport means being at right angles to that of the delivery means.

5 Claims, 12 Drawing Figures

APPARATUS FOR ROLLING UP A PASTRY LAYER AND A SEPARATOR SHEET

The present invention relates generally to pastry or like products and to a method and apparatus for handling such products.

The method and apparatus are particularly suitable for use in connection with pastry which is supplied to the user in at least a partially processed form and it will be convenient to hereinafter describe the invention with reference to that particular application. Nevertheless it is to be understood that the method and apparatus of the present invention may be suitable for other products.

According to one aspect of the present invention there is provided apparatus for handling a pastry product of the type comprising a pastry sheet unit and a film sheet unit which are adapted to be rolled together so that in the finished roll the film sheet unit is substantially interposed between the adjacent layers of the pastry sheet unit, the film sheet unit and pastry sheet unit each having a leading edge and trailing edge characterised in that the apparatus comprises transport means for transporting said pastry sheet unit past a film application station, means for directing and applying said film sheet unit to a surface of the pastry sheet unit at the film application station so that the leading edge of the film sheet unit overlies and is disposed rearwardly of the leadirg edge of the pastry sheet unit the apparatus being suitable for use with roll forming means for at least partially rolling the film and pastry sheet units into a roll commencing from the leading edge of the pastry sheet unit.

According to another aspect of the present invention there is provided apparatus for handling a pastry product of the type comprising a pastry sheet unit and a film sheet unit which are adapted to be rolled together so that in the finished roll the film sheet unit is substantially interposed between the adjacent layers of the pastry sheet unit, the film sheet unit and pastry sheet unit each having a leading edge and trailing edge the apparatus being suitable for use with roll forming means characterised in that the apparatus comprises transport means for transporting a continuous sheet of pastry defining a plurality of said pastry sheet units past a film application station, means for directing and applying said film sheet unit to a surface of the continuous pastry sheet at the film application station, said continuous sheets having side edges parallel to the direction of travel of the transport means, the side edges of the continuous sheets subsequently defining the leading and trailing edges of the pastry and film sheet units subsequently formed, cutting means for selectively cutting said continuous sheets into the discrete sheet units, delivery means for delivering the sheet units from the transport means to the roll forming means, the direction of travel of the delivery means being substantially normal to the direction of travel of the transport means.

In this latter mentioned aspect the leading edge of each film sheet unit may also overlie and be disposed rearwardly of the leading edge of the pastry sheet unit.

Preferably a portion of the film sheet unit and its trailing edge extend rearwardly of the trailing edge of the pastry sheet unit so that after rolling the final outer portion of the roll of pastry sheet unit is overlayed by the trailing portion of the film sheet unit.

In the first mentioned aspect above the apparatus may also include means for feeding pastry material to the transport means as a continuous sheet which defines a plurality of said pastry sheet units said continuous sheets having side edges parallel to the direction of travel of the transport means. The apparatus may further include means for feeding film sheet onto a surface of the continuous film sheet which defines a plurality of said film sheet units and in the direction of travel of the transport means the side edges of the continuous sheet defining the leading and trailing edges of the pastry and film sheet units subsequently formed. Preferably cutting means is provided for selectively cutting said continuous sheets into the discrete sheet units. Delivery means may be provided for delivering the sheet units from the transport means to the roll forming means.

Preferably two delivery means are arranged in parallel and the gate being adapted to selectively transfer sheet units to one or the other of the parallel delivery means.

According to yet another aspect of the present invention there is provided a method of handling a pastry product of the type comprising a pastry sheet unit and a film sheet unit which are adapted to be rolled together so that, in the finished roll, the film sheet unit is substantially interposed between the adjacent layers of the pastry sheet unit the film sheet unit and the pastry sheet unit each having a leading edge and a trailing edge, the method characterised by the steps of positioning the film sheet unit on top of the pastry sheet unit so that the leading edge of the film sheet unit is disposed rearwardly of the leading edge of the pastry sheet unit and rolling the two sheet units together commencing from the leading edge of the pastry sheet unit.

Preferably the direction of travel of the delivery means is substantially normal to the direction of travel of the transport means.

Preferably the delivery means is mounted for reciprocating movement in the direction of travel of the transport means.

The apparatus may further include transfer means for transferring the sheets from the transport means to the delivery means. Preferably the transfer means comprises a gate which is adapted to open and close.

The apparatus may further include spacer means for spacing the sheet units from one another after being cut by the cutting means. Preferably the delivery means comprises a conveyor supported on a carriage which is adapted for reciprocating movement in the direction of travel of the transport means. The carriage may include a power screw adapted to cause the reciprocating movement.

According to yet another aspect of the present invention there is provided a pastry product comprising a pastry sheet unit and a film sheet unit which are adapted to be rolled together so that in the finished roll the finished sheet unit is substantially interposed between the adjacent layers of the pastry sheet unit, the film sheet unit and the pastry sheet unit having a leading edge and a trailing edge characterised by the leading edge of the film sheet unit overlying and extending rearwardly of the leading edge of the pastry sheet unit prior to being rolled together.

In the particular form of the invention in which the leading edge of the film sheet is displaced rearwardly of the leading edge of the pastry sheet so that when rolling is commenced the leading edge of the pastry sheet will initially contact a portion of the pastry sheet. When used in connection with the rolling means described above this provides sufficient frictional contact for rolling to continue.

By the term film sheet is meant any suitable interleaving material such as for example wax paper polymeric material or the like.

Preferred embodiments of the invention will hereinafter be described with reference to the accompanying drawings, in which.

Figure 10:
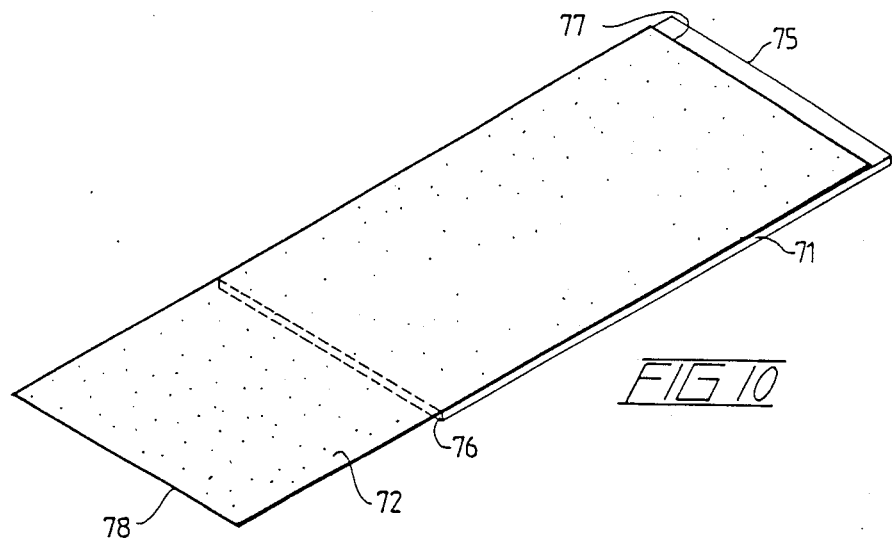
FIGS. 10 to 12 are schematic views showing the formation of the pastry product according to the invention.
Figure 11:
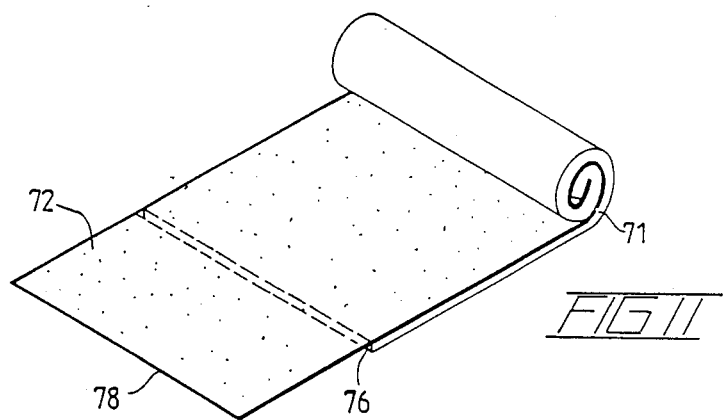
Figure 12:
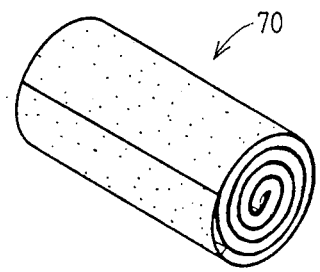

As best seen in FIGS. 10 to 12 the pastry product of the present invention comprises a pastry sheet unit 71 and a film sheet unit 72 which are adapted to be rolled together to form a finished roll 70. Each sheet unit 71 and 72 has a leading edge and a trailing edge 75 and 76 and 77 and 78 respectively. When rolled together the film sheet unit 72 is interposed between adjacent layers of the pastry sheet unit 71 so as to inhibit the adjacent layers from sticking together. In the product of the present invention, prior to rolling, the leading edge portion 79 of the film, sheet unit 72 is displaced rearwardly from the leading edge 75 of the pastry sheet unit 71 and rolling is instigated from the leading edges of the sheets. As shown it is preferable that the trailing edge of the film sheet unit is disposed rearwardly relative to that of the pastry sheet unit. Thus by rolling in the manner shown it is possible to form a roll 70 in which the last surface portion of the pastry sheet unit is overlaid by the trailing portion of the film sheet unit.

Referring to FIGS. 1 to 5 of the drawings, pastry material in the form of a continuous sheet 60 having side edges 61 is fed to film applying station 5 via a conveyor (not shown). At the film applying station 5 a roll of film material 20 is mounted and arranged to be fed to the sheet of pastry 60 through the film guide and application device 15 which comprises suitably arranged drive rolls and guides. The sheet of pastry 60 is transferred through the applying station 5 via transport means 8 in the form of a conveyor 9. Thus the pastry material and film applied thereto are at this stage in the form of continuous sheets 60 and 20 from which the sheet units are formed. The leading and trailing edges of each sheet unit are at this stage defined by the parallel side edges 61 and 21 of the continuous sheets. Although many different types of film material could be suitable for the product a preferred material is a plastic film termed CRISPY-WRAP (Trade Mark).

The drive rolls and guides 15 are so arranged so that the edges 21 of the continuous film sheet 20 are offset relative to the side edges 61 of the continuous pastry sheet 60 thereby enabling the sheet units and their relative disposition as described above to be achieved. Preferably since the overlap of the trailing edge portion of the continuous sheet unit is wider than the portion of the leading edge thereof relative to that of the pastry sheet the roll of film sheet is slightly wider than the continuous sheet of pastry.

Preferably water is applied to the surface of the pastry sheet prior to applying the film sheet 20 thereto the water tending to enhance adhesion between the two sheets. The water may be applied using a water roller however in a preferred form a plurality of nozzles (not shown) are arranged at the station just upstream from the drive rolls and guides 15.

Cutting means 40 in the form of a powered guillotine separates the continuous sheets into discrete sheet units 71 and 72 of selected size. The guillotine is disposed downstream of the station 5. Suitable control means is provided to control operation of the transport conveyor 9 and the guillotine.

The separate sheet units 71 and 72 are then transferred to a spacer means in the form of an accelerating conveyor belt 35 which spaces adjacent sheets apart at a desired distance. Such a belt is of conventional form and it is not necessary to describe in detail here.

The separate sheet units are then selectively transferred to delivery means in the form of conveyors 46 and 48 whose direction of travel is normal to the direction of travel of the transport conveyor 9. The delivery conveyors 46 and 48 are mounted on a carriage member 49 which is adapted to reciprocate in a direction parallel to the direction of travel of the feed conveyor and which is operable to move at substantially the same speed as the conveyor 35 so that the sheets of material can be transferred thereto with little or no relative movement between the two conveyor systems.

Figure 1:
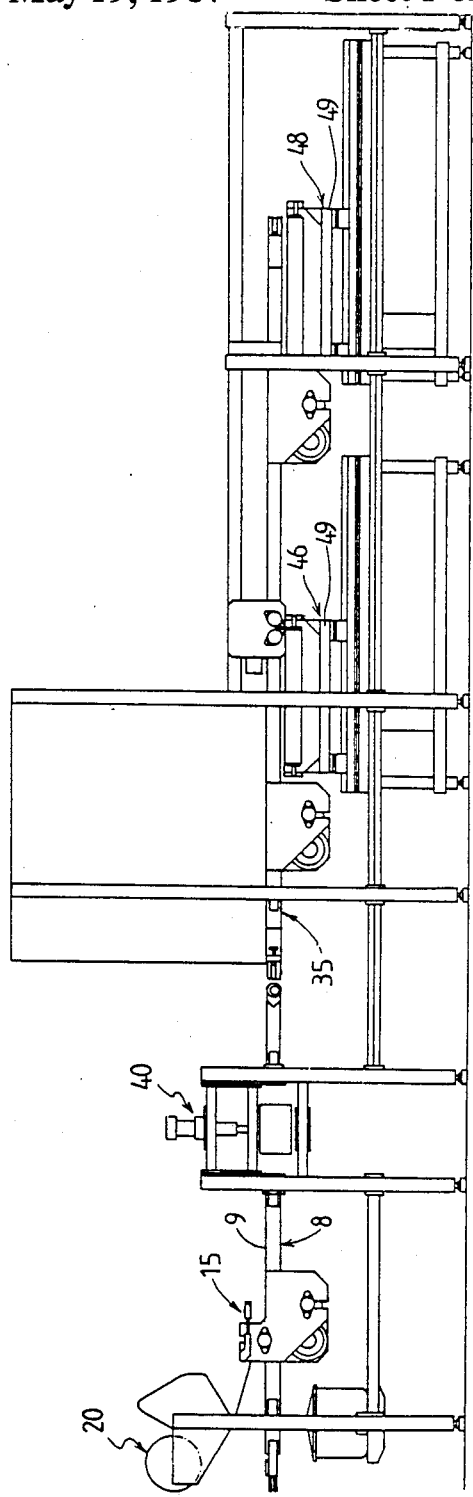
FIG. 1 is a schematic side elevation of apparatus according to the invention.
Figure 2:
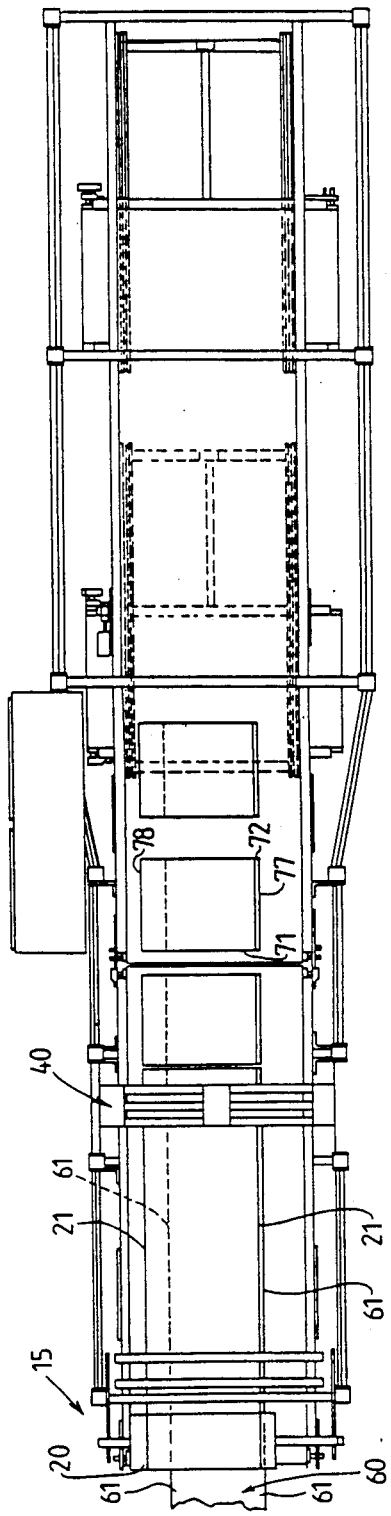
FIG. 2 is a plan view of the apparatus shown in FIG. 1.
Figure 3:
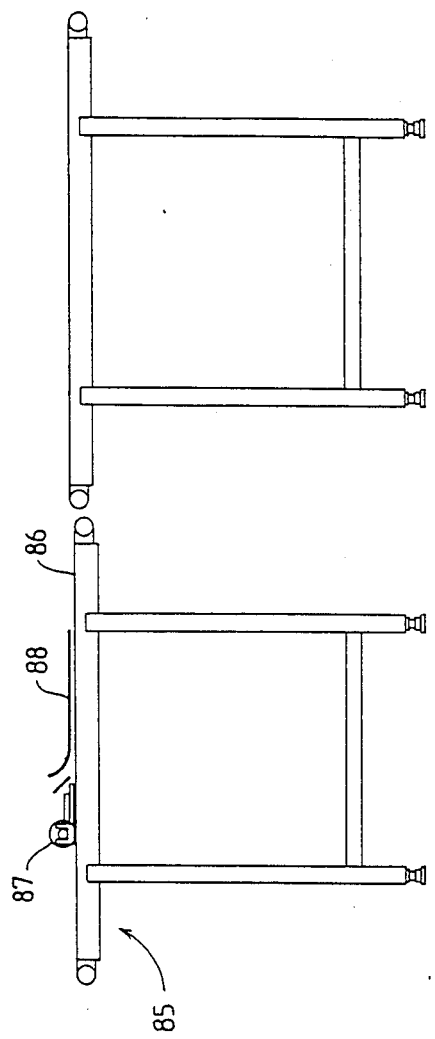
FIG. 3 is a schematic side elevation of apparatus for forming the sheet products into a roll.
Figure 4:
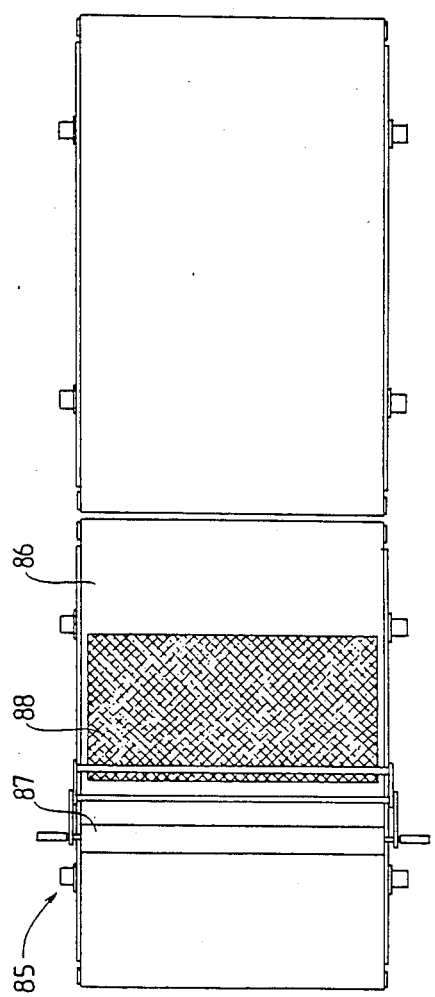
FIG. 4 is a plan view of the apparatus shown in FIG. 3.
Figure 6:
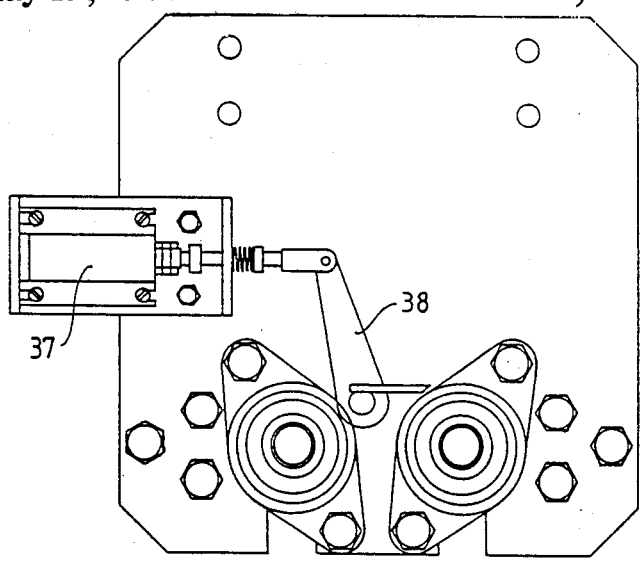
FIGS. 5 and 6 are more detailed views of the transfer means which form part of the apparatus shown in FIGS. 1 and 2.
Figure 5:
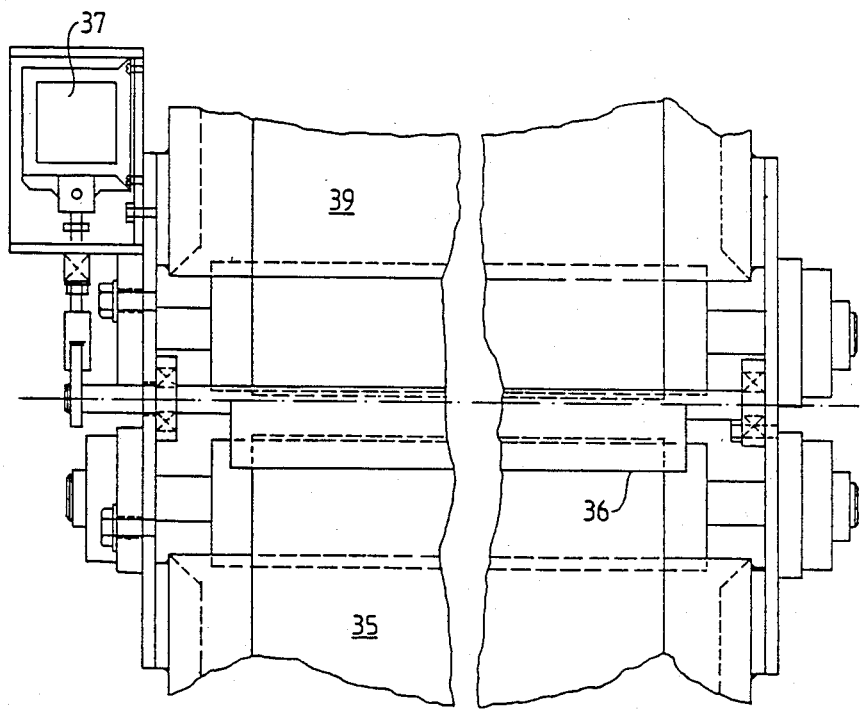
Figure 7:
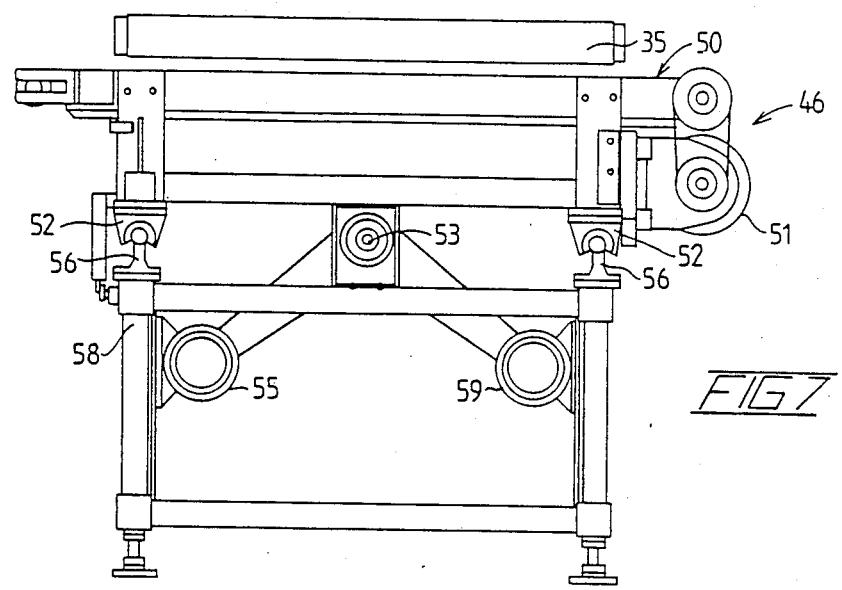
FIGS. 7 to 9 are more detailed schematic views of the delivery means which form part of the apparatus shown in FIGS. 1 and 2.
Figure 8:
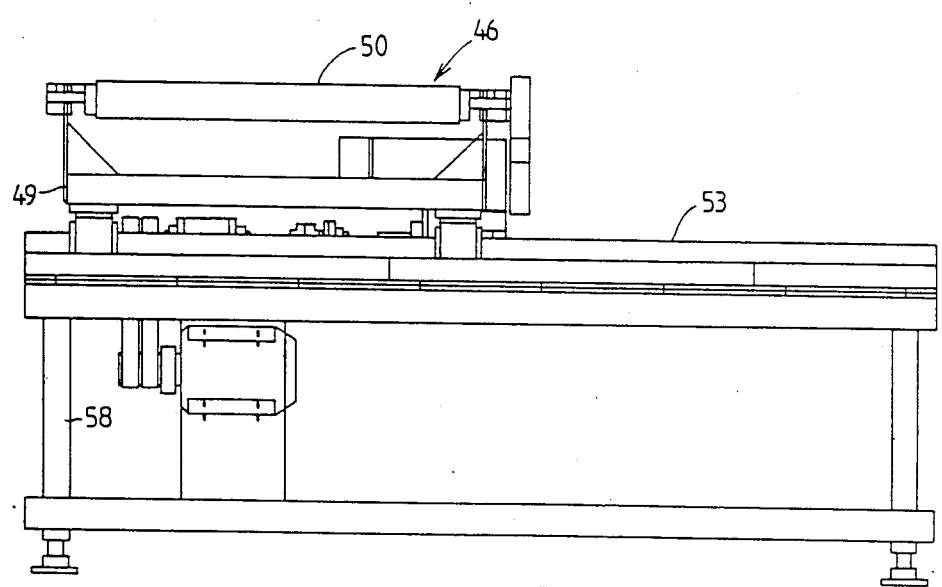
Figure 9:
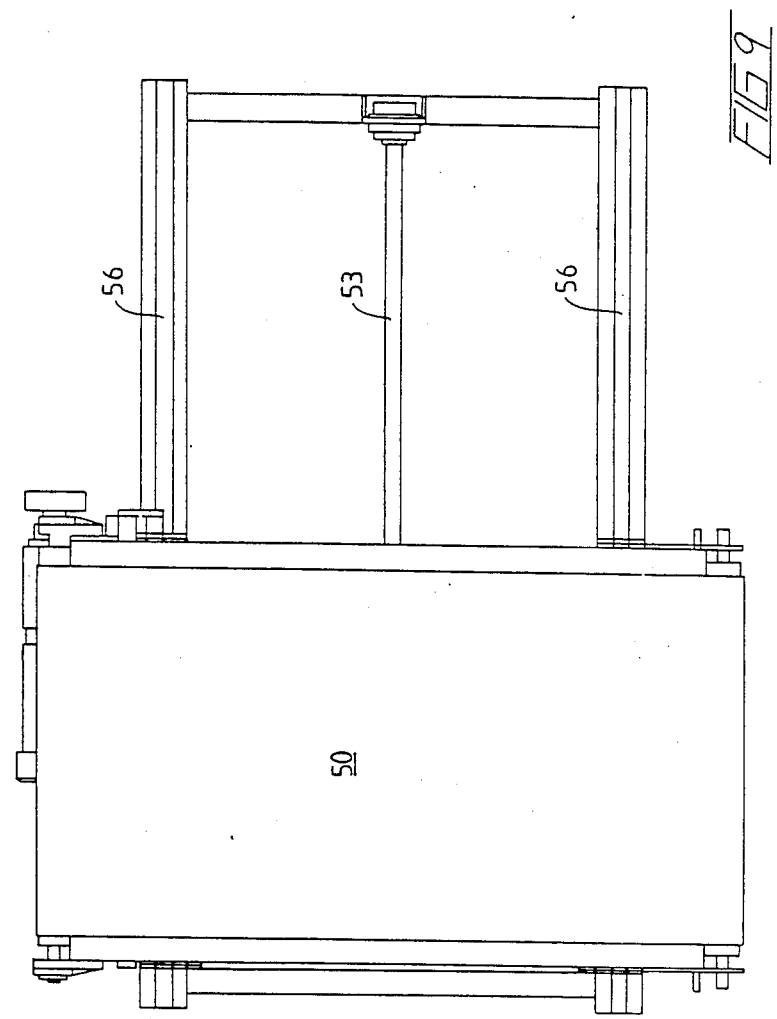

Referring to FIGS. 7 to 9 which show one of the delivery conveyors 46 comprises a conveyor belt 50 which is driven by motor 51. The conveyor belt 50 is mounted on a carriage member 49 which includes a pair of guides 52 which run on tracks 56 supported by frame 58. A power screw 53 is operatively connected to the carriage by ball nut assemblies 54. The power screw is driven by motors 55 and 59 one motor for use when the pastry products are transferred onto it from the conveyor 35 and the other for returning it to its initial position. The motor which returns the carriage to its initial position is adapted to move it much faster than the other motor.

Transfer means comprising a gate 36 is operable via a photo-electric counter to permit the transfer of a select number of sheets to delivery conveyor 46 and thereafter enable a further select number of sheets to be transferred to delivery conveyor 48.

The gate 36 is operable for movement between a lowered position in which the sheets pass from conveyor 35 to conveyor 39 from which the sheets are transferred to delivery conveyor 48, and an upper position in which the sheets are transferred to delivery conveyor 46. The gate 36 is actuated by solenoid 37 and lever 38.

The sheets when positioned on the delivery conveyors 46 and 48 are now arranged with their leading edges facing the direction of travel. The delivery conveyors transfer the sheets to roll-up apparatus 85.

The roll-up apparatus comprises a work station which includes a conveyor belt 86 a leading edge pick-up device 87 and a drag inducing member 88. Thus as the leading edge of the pastry material approaches the station a series of fingers which are pivotally mounted pick-up the leading edge so that it is turned back on itself whereafter this portion engages the drag member which is in the form of a chain wire mesh which thereby at least partially rolls the two sheets together.

The partially rolled product is then transferred to a further station where rolling of the product is completed. After rolling is completed the product can be transferred to a packaging station where it is placed in a package.

We claim:

1. An apparatus for forming a rolled pastry product of the type comprising a pastry sheet and a film sheet which are adapted to be rolled together so that in the finished roll the film sheet unit is substantially interposed between the adjacent layers of the pastry sheet unit, said apparatus comprising means for forming said sheets into a roll, transport means for transporting a continuous pastry sheet in a first direction, means for directing and applying a continuous sheet of film to a surface of said continuous pastry sheet in the same direction with the side edges of said film being laterally offset with respect to the side edges of said pastry sheet, cutting means for separating said pastry sheet and film into individual units and delivery means for delivering each unit in a second direction perpendicular to said first direction to said means for forming said sheets into a roll with the leading edge of the film when moving in the second direction overlying and disposed rearwardly of the leading edge of the pastry sheet of each unit to facilitate the rolling of each unit and with the trailing edge of the film extending rearwardly of the trailing edge of the pastry sheet of each unit.

2. An apparatus according to claim 1 wherein said separating means includes cutting means for selectively cutting said continuous sheets into discrete sheet units and spacer means for spacing the sheet units from one another after being cut by said cutting means.

3. An apparatus according to claim 2 wherein said delivery means is comprised of a carriage mounted for reciprocating movement in the direction of travel of said transport means adjacent the end of said transport means and a conveyor supported on said carriage for movement in said second direction perpendicular to the direction of travel of said transport means.

4. An apparatus as set forth in claim 3 further comprising transfer means including gate means adapted to open and close for transferring said sheet units to said delivery means.

5. An apparatus according to claim 4 wherein two delivery means are arranged in parallel with said gate means being adapted to selectively transfer sheet units to one of said parallel delivery means.

* * * * *